United States Patent [19]

Fagerquist et al.

[11] Patent Number: 4,928,115
[45] Date of Patent: May 22, 1990

[54] CONTINUOUS INK JET PRINTER HAVING REMOTELY OPERABLE PRINT HEAD ASSEMBLY

[75] Inventors: Randy L. Fagerquist; Wendall L. Wood; Frank W. Atkins, Dayton; Surinder K. Bahl, Beavercreek, all of Ohio

[73] Assignee: Eastman Kodak Company, Rochester, N.Y.

[21] Appl. No.: 265,102

[22] Filed: Oct. 31, 1988

[51] Int. Cl.$^5$ ............................................ G01D 15/18
[52] U.S. Cl. .................................. 346/75; 346/140 R
[58] Field of Search ............................. 346/75, 140 R

[56] References Cited

U.S. PATENT DOCUMENTS 4,367,479  1/1983  Bower ............................ 346/140 R
4,617,574  10/1986  Miller et al. ........................ 346/75

Primary Examiner—Bruce A. Reynolds
Assistant Examiner—Gerald E. Preston
Attorney, Agent, or Firm—John D. Husser

[57] ABSTRACT

A remote print head assembly for a continuous ink jet printing system includes an upper print head portion for generating ink droplet streams and a lower print head portion for selectively charging and catching droplets. A frame surrounds the upper and lower print head portions and has a print droplet egress opening. A closure member is selectively movable to open or close the droplet egress respectively to allow printing or to effect print head start-up operations.

2 Claims, 4 Drawing Sheets

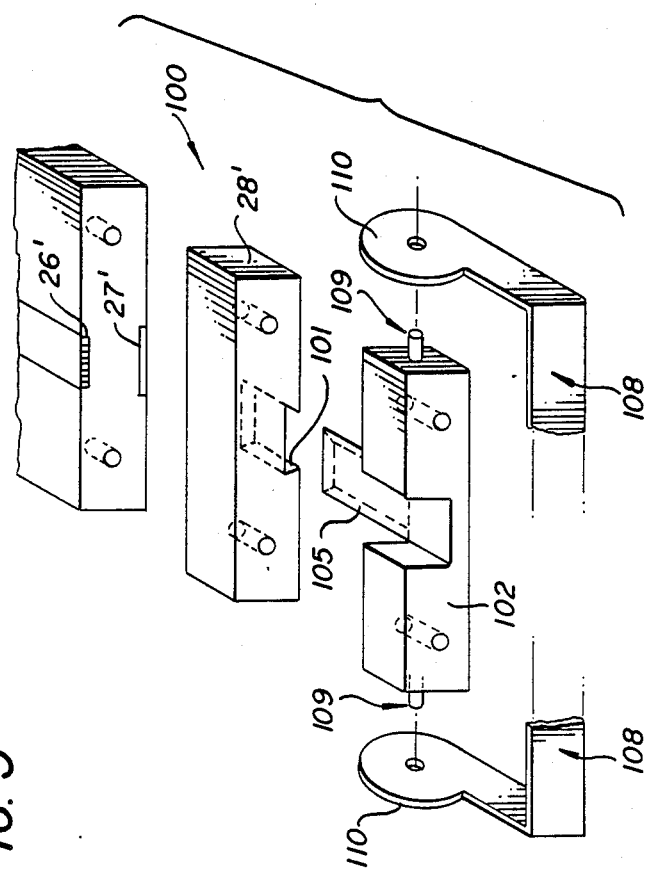
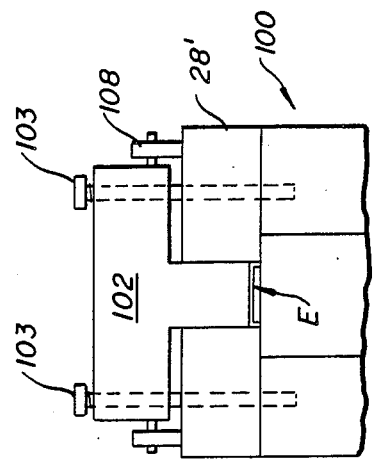
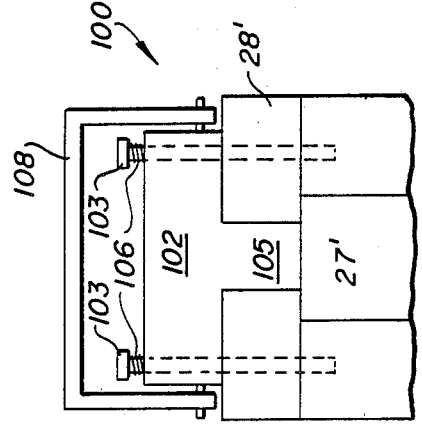
FIG. 4
FIG. 5
FIG. 6

CONTINUOUS INK JET PRINTER HAVING REMOTELY OPERABLE PRINT HEAD ASSEMBLY

FIELD OF INVENTION

The present invention relates to continuous ink jet printing and more specifically to print head constructions of such apparatus that enable printing head operations (including start-up and maintenance) at locations remote from a printer mainframe that houses, e.g. the ink circulating system and electronic packages of the printer.

BACKGROUND ART

U.S. Pat. Nos. 4,591,870 and 4,623,897 describe a continuous ink jet printer intended for use in an office environment. To meet the requirements of such an environment, the printer is relatively small and employs a miniature print head that traverses a print platen to print successive line portions of a print sheet on the platen. The office environment also dictates that the printer be easy to "start-up", be substantially free from any complicated user maintenance and not require frequent service calls. To provide this capability, the printer includes a built-in start-up and maintenance station, commonly called a home station, which is located at the side of the print head traverse path. The print head is moved over, and into sealed relation with, a chamber of the home station where various cleaning, drying and diagnostic operations are performed under control of programs stored in the printer's control system.

For example, the above cited U.S. patents describe how: (i) ink and ultrasonic vibrations are used to clean the orifices and the droplet charging and catcher surfaces of the print head; (ii) ink solvent condensate is used to wash those surfaces; and (iii) pressurized air is directed to skive and dry those surfaces. Excess ink flows from the home station back to the main ink reservoir of the printer. U.S. Pat. No. 4,616,234 describes how an electrometer located in the home station can be used to measure the current produced by charged ink drops during testing sequences, effected by the printer control, to properly set the charging and stimulation pulses for the print head. These systems enable the miniature print head to provide high resolution output, reliably, in the intended office environment.

For certain applications it would be desirable to enable a miniature print head, such as described above, to have the capability to be located away from the printer mainframe for remote operation, with only umbilical connections for ink circulation and electronic control. This goal can be attained except for the problems of implementing start-up and periodic maintenance at a remote location, i.e. without the mainframe home station.

SUMMARY OF INVENTION

One important purpose of the present invention is to provide a print head assembly which enables remote print head operation by incorporating into the print head itself, structural features that can accommodate the start-up and maintenance procedures previously requiring a mainframe home station. In addition, such an improved print head can be used within printer mainframes to reduce the printer cost and complexity, e.g. by eliminating the separate home station system of the printer.

In one aspect the present invention constitutes in a continuous ink jet printer of the kind having a system for circulating ink to and from a print head and means for controlling the droplet charging function of the print head in accord with information or test signals, a remote print head assembly comprising: (a) a frame for supporting upper and lower print head means; (b) upper print head means for receiving ink under pressure and generating a plurality of droplet streams; (c) lower print head means for receiving signals to selectively charge, deflect and catch predetermined ink droplets from the upper print head means; (d) side wall means surrounding the droplet path from the upper print head means past the lower print means; and (e) bottom wall means for moving between: (i) a position opening the droplet path from the print head and (ii) a position closing the droplet path from the print head.

Other improved features of the remote print head system includes an integral droplet current detector and a vacuum effected air skive implemented through the catcher outlet.

BRIEF DESCRIPTION OF DRAWINGS

The subsequent description of preferred embodiments of the invention refers to the accompanying drawings wherein:

FIG. 4 is an exploded perspective view of one preferred device for selectively opening and closing the FIG. 2 print head assembly;

FIGS. 5 and 6 are bottom views of the FIG. 3 print head assembly showing the FIG. 4 device in open and closed positions;

DETAILED DESCRIPTION OF PREFERRED EMBODIMENTS

Figure 1:
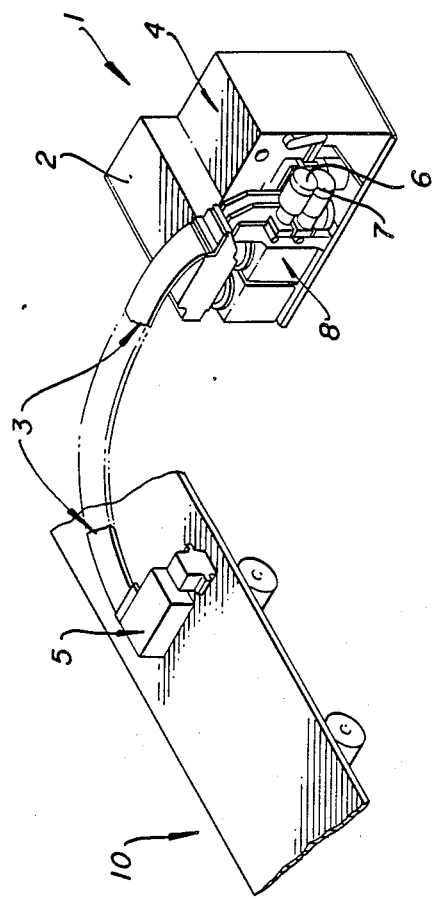
FIG. 1 is a perspective schematic view illustrating one embodiment of the present invention.

FIG. 1 shows schematically one embodiment of the present invention to include a mainframe assembly 1 and a print head assembly 5 coupled by fluid and electrical umbilical means 3. The mainframe assembly includes power supply 2, logic and control means (e.g. microprocessor and related circuit boards designated generally 4), ink supply 8 and ink and vacuum pumps 6, 7. The ink circulation system can take various forms known in the art, e.g. such as described in U.S. Pat. No. 4,591,875.

Figure 2:
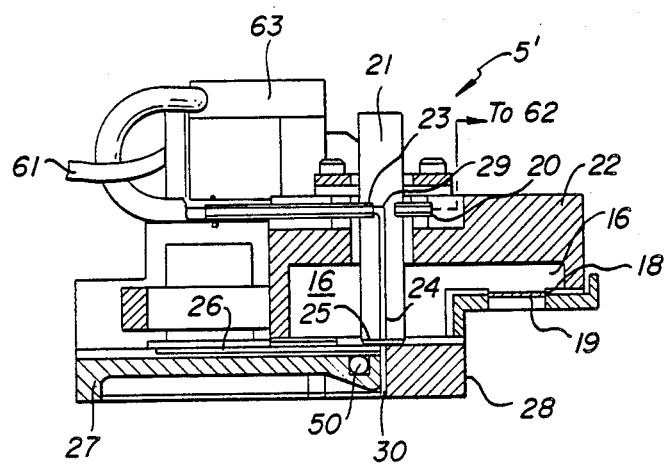
FIG. 2 is a cross-sectional view of a prior art print head of the kind discussed in the Background Art section.

The print head assembly 5 is located remotely from the mainframe 1, e.g. over a conveyor 10 in a location to personalize or address mail items. The print head can have many of the same features of the miniature print head previously used in traversing a print sheet feed through a mainframe. FIG. 2 illustrates such a miniature print head assembly 5' which has been used previously to traverse a print platen within prior art continuous ink jet printers. The assembly has a mounting frame 22 which forms an upper print head chamber 16 and which supports the components of the upper and lower print head portions of the assembly. The upper print head portion includes a resonator block 21 which has an inlet 23 that receives ink under pressure from inlet conduit 61 via final filter 63 and directs it via inlet passage 29 to a manifold region 24 in the interior of the resonator block. An outlet passage (not shown, but also within block 21) directs excess ink from to resonator outlet 20, from whence it is recirculated back to the ink supply reservoir via outlet conduit 62. U.S. Pat. No. 4,683,477 discloses a highly useful print head resonator block construction. An orifice plate 25 is mounted over the manifold region 24 of resonator block 21 and has a plurality of orifices that direct ink streams through the outlet passage 30 of the lower print head assembly portion. A piezoelectric stimulation system (not shown) is formed on block 21 and is electrically energized at a predetermined frequency to vibrate the block and orifice plate 25 and thus stimulate uniform droplet breakup of the ink streams. Heater element 50 is provided to prevent ink condensation on critical print head surfaces. An air inlet passage 19 covered by a filter 18 is provided in the print head frame to provide protective airflow during printing (see U.S. Pat. No. 4,591,869) and to provide an inlet for forced skive air during start-up (see U.S. Pat. No. 4,623,897).

Figure 3:
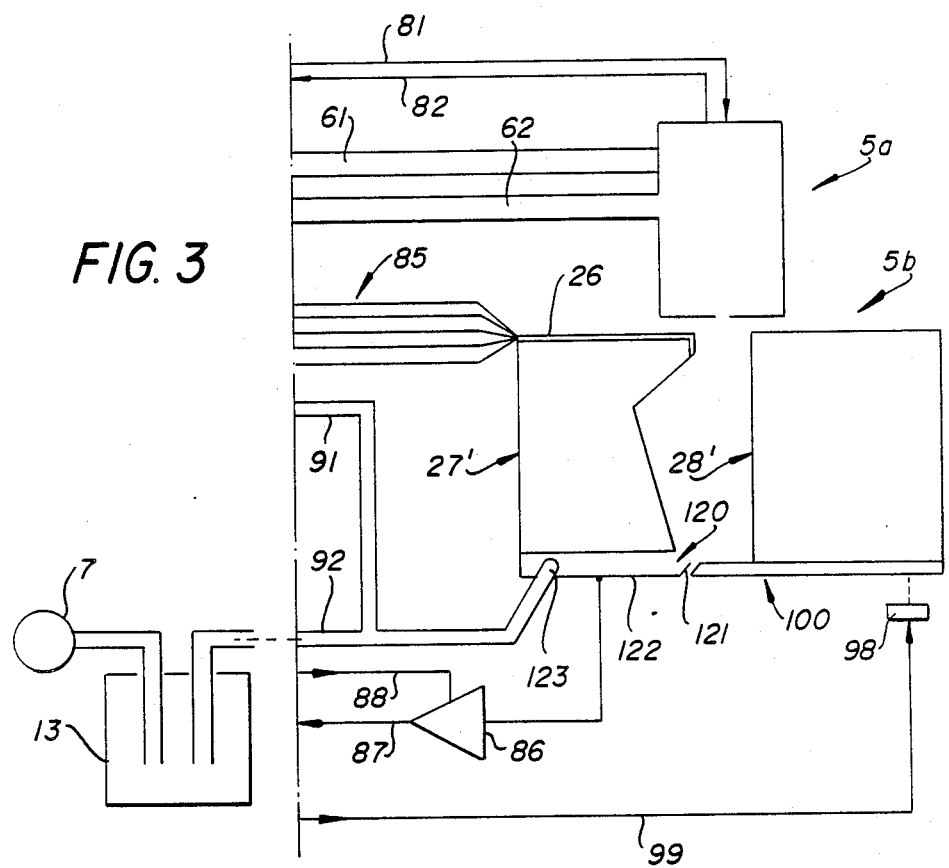
FIG. 3 is a schematic diagram illustrating the layout of one preferred remote print head assembly in accord with the present invention and its cooperative relations with a mainframe continuous ink jet printer system.

Referring now to FIG. 3, the fluid and electrical couplings implemented between mainframe 1 and print head 5 by umbilical 3 are illustrated in more detail. Thus, upper print head portion 5a receives stimulating drive signals and returns vibration feedback signals via electrical lines 81, 82 and receives and returns ink via conduits 61, 62. The charge plate assembly of lower print head portion 5b receives droplet charging signals for printing or testing from the mainframe logic 4 (shown in FIG. 1) via lines 85 and provides signals to the mainframe logic phase detection system via transresistance amplifier 86 and line 87. The amplifier is powered via line 88 from the mainframe. The lower print head portion 5b also has vacuum line couplings 91 and 92 to the mainframe respectively for returning caught ink and effecting a negative pressure dry cycle, as described in detail in concurrently filed U.S. application Ser. No. 07/265101, entitled "Improved Air Skiving System For Ink Jet Printer Start-Up", in the names of R. Fagerquist et al.

The lower print head portion 5b of FIG. 3 differs, in accord with the present invention, in several aspects from the FIG. 2 print head. In one important aspect, the lower print head portion 5b comprises a bottom wall device 100 which can be actuated by solenoid 98, via line 99 from the mainframe, to selectively open or close the egress path from the upper print head to the print zone. One preferred construction for device 100 is shown in FIGS. 4–6, where it can be seen that the lower portion of the wall 28' (which cooperates to define the drop egress path) comprises a groove 101. An opening and closing member 102 interfits in wall member 28' and is supported for sliding movement on pins 103. The member 102 comprises a tongue portion 105 which slides in groove 101. Member 102 is biased by springs 106 to a closed position wherein tongue member 105 extends across the drop egress path of the lower print head 5b. An actuator bail 108 is mounted on the ends of member 102 by pins 109 and has cam portions adapted to engage the surface of the opposing wall of member 28' and move the member 102 away from member 28. This movement retracts tongue portion 105 and opens the print head assembly egress path. Thus, upon actuation of bail 108 (e.g. by solenoid 98 shown in FIG. 3), the tongue member 105 can be selectively moved between the open position shown in FIG. 5 and the closed position shown in FIG. 6. This selectively shuts and opens the droplet egress path E shown in FIG. 5.

Figure 7:
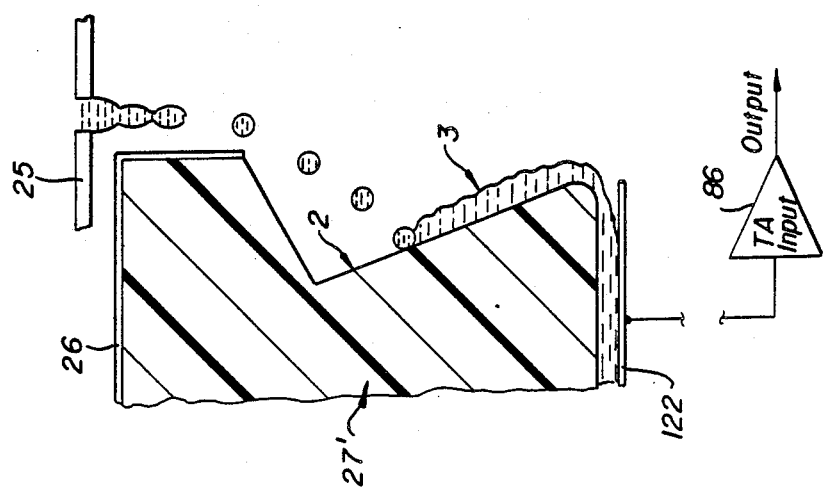
FIG. 7 is a cross-sectional view of one preferred catcher outlet construction for effecting air skiving in accord with the present invention.

Before describing preferred modes of start-up and maintenance operation using the device 100, some other preferred structural differences between the FIG. 3 system and the prior art system of FIG. 2 should be noted. First, the throat 120 of the catcher assembly is increased in thickness to be in the range of about 10 to 50 mils. This provides increased airflow capability for the air skive procedures during start-up and maintenance cycles. The lip 121 of the catcher 27' can be angled upwardly, e.g. in the range from 0° to 45° with respect to the bottom wall 122 to enhance collection capability with the increased throat dimension. In addition, the outlet from the catcher throat can be changed from exiting through the bottom wall to a side or rear exit 123, 123' (as shown more clearly in FIG. 7) and is increased in dimension to a diameter in the range of about 130 to 180 mils. These modifications can enable the print head bottom to rest on a flat surface.

Figure 8:
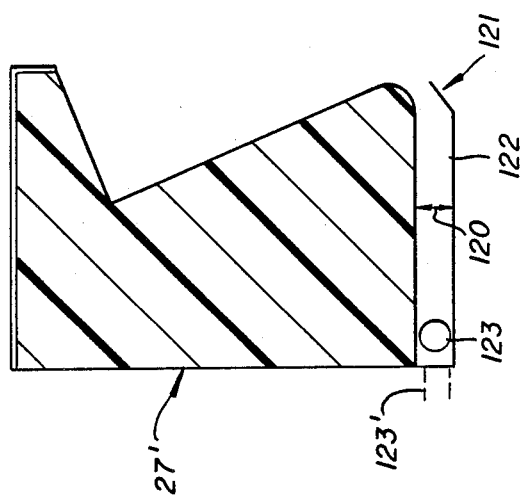
FIG. 8 is a cross-sectional view of one preferred catcher construction for effecting droplet current detection in accord with the present invention.

Referring to FIG. 8, it can be seen that the body of the catcher 27' is formed of a dielectric material, e.g. molded plastic and that electrometer amplifier 86 is electrically connected to the catcher pan 122, which is formed of metal. This modification enables the current provided by the caught droplets to be detected by the catcher pan and transresistance amplifier 86 rather than by a separate home station electrometer.

In start-up and maintenance operations of the remote print head system described above, the member 102 is moved to the closed position and clean cycles are commenced. First, the mainframe vacuum pump 7 is actuated at a high output rate to produce an airflow through throat 120 of about 20 to 30 ft$^3$/hr. Next, ink is controlled to flush over surfaces of the charge plate and catcher and the resonator is actuated at ultrasonic frequencies to loosen particles on those surfaces. The negative pressure created by vacuum pump 7 induces an air inflow through to passage 19 in the upper print head that skives ink from the charge plate and catcher face surfaces into the catcher throat and thence to catch pan 130 (located in the mainframe on the line to the vacuum pump). The bottom wall sealing, provided by device 100 during these stages, prevents ink leakage from the print head. Subsequent condensate washing and drying sequences can be performed, in accord with the teachings of U.S. Pat. No. 4,591,870, with the bottom wall closed.

Next, with bottom wall 105 still closed, the phase detection and setting procedures can be performed. For example, the procedures described in U.S. Pat. No. 4,616,234 can be utilized to selectively charge drops, over a time phase change, and the catcher pan and transresistance amplifier measure the current produced for phase adjustment by the mainframe logic. Uncharged droplets and droplets not sufficiently charged to impact the catcher surface are caught by the still-closed bottom wall member 105 and withdrawn, with the ink mass formed by the charged droplets, through line 91 leading to the mainframe ink reservoir. When the phase adjustment is completed, the printer logic sets all drop streams to a caught mode. The bottom of the print head assembly is then opened to the FIG. 5 condition and printing signals can be addressed to the charge plate to selectively allow drops to pass through the egress opening E to the print media.

Although the present invention has been described with the print head connected to a separate mainframe by a fluid/electrical umbilical, it also can be used with advantage within a printer mainframe, e.g. to avoid need for a mainframe home station. The invention has been described in detail with particular reference to preferred embodiments thereof, but it will be understood that variations and modifications can be effected within the spirit and scope of the invention.

I claim:

1. A continuous ink jet printer system having a remote printing capability, said system comprising:
    (a) a mainframe subsystem including an ink supply reservoir, ink recirculating means, a power supply and data handling and machine control means, including phase adjustment means;
    (b) a remotely operable, continuous ink jet print head assembly including:
        (i) upper print head means for generating a plurality of continuous droplet streams;
        (ii) drop charge means, including a plurality of drop charge electrodes, for selectively charging droplets of said streams; and
        (iii) droplet catcher means including an electrically conductive catcher pan, a catcher ink egress and a dielectric drop impact surface separating said catcher pan and said drop charge means;
        (iv) housing means for supporting and defining an enclosure chamber around said upper head means and drop charge means and said catcher means, said housing including movable lower wall means for selectively opening and closing a printing egress for selectively opening and closing a printing egress for said drop streams; and
    (c) fluid and electrical umbilical means for coupling said mainframe subsystem and said remote print head assembly, including:
        (i) conduit means coupling said upper print head to said ink supply reservoir and said catcher ink egress to said recirculation means; and
        (ii) electrical lines coupling said drop charge means to said power supply and said catcher pan to said machine control means for phase adjustment operations.

2. The invention defined in claim 1 wherein said mainframe subsystem includes a vacuum source, said housing means includes a filtered air inlet proximate said drop charge means and said umbilical means includes a conduit coupling said catcher ink egress and said vacuum source.

* * * * *